US012560025B2

(12) United States Patent
Seysen

(10) Patent No.: US 12,560,025 B2
(45) Date of Patent: Feb. 24, 2026

(54) EMERGENCY OPENING DEVICE FOR A LIFTING GATE ASSEMBLY, LIFTING GATE ASSEMBLY AND METHOD FOR OPENING A LIFTING GATE ASSEMBLY WITH AN EMERGENCY OPENING DEVICE

(71) Applicant: Seysen Gmbh & Co. KG, Grafelfing (DE)

(72) Inventor: Manfred Seysen, Grafelfing (DE)

(73) Assignee: SEYSEN GMBH & CO. KG (DE)

( * ) Notice: Subject to any disclaimer, the term of this patent is extended or adjusted under 35 U.S.C. 154(b) by 0 days.

(21) Appl. No.: 18/703,248

(22) PCT Filed: Sep. 29, 2022

(86) PCT No.: PCT/EP2022/077208
§ 371 (c)(1),
(2) Date: Apr. 19, 2024

(87) PCT Pub. No.: WO2023/066636
PCT Pub. Date: Apr. 27, 2023

(65) Prior Publication Data

US 2024/0418024 A1 Dec. 19, 2024

(30) Foreign Application Priority Data

Oct. 21, 2021 (DE) ......................... 102021127311.0

(51) Int. Cl.
*E06B 9/74* (2006.01)
*E05F 1/16* (2006.01)
*E05F 15/665* (2015.01)

(52) U.S. Cl.
CPC .................. *E06B 9/74* (2013.01); *E05F 1/16* (2013.01); *E05F 15/665* (2015.01); (Continued)

(58) Field of Classification Search
CPC ........................................................ E06B 9/74
See application file for complete search history.

(56) References Cited

U.S. PATENT DOCUMENTS 2,578,894 A * 12/1951 Maurer .................. E05F 15/56 16/443
2,710,186 A * 6/1955 Maurer ................. E05F 15/565 49/362

(Continued)

FOREIGN PATENT DOCUMENTS

CA 2870543 C * 2/2019 .............. E05F 15/73
CH 687266 A5 * 10/1996 ............ H01H 35/00

(Continued)

*Primary Examiner* — Catherine A Kelly
(74) *Attorney, Agent, or Firm* — Ingrassia Fisher & Lorenz LLP

(57) ABSTRACT

An emergency opening device for a lifting door as well as a lifting door with such an emergency opening device and a method for operating such an emergency opening device are provided. The emergency opening device has a driver, a movement element, an elongate drive member and a locking element. The driver is rotatably mountable on a rotationally fixed inner shaft of a drive device of the lifting door and is configured to be selectively connected to the drive device. The elongate drive member is connected to the movement element and is configured to transmit a movement caused by the movement element to the driver. The movement element is, for example, an elastic element which is pretensioned in a standby position and is configured to relax and to drive the elongate drive member by the released tension energy when the locking element is released.

10 Claims, 3 Drawing Sheets

(52) U.S. Cl.
CPC ... *E05Y 2201/224* (2013.01); *E05Y 2201/244* (2013.01); *E05Y 2201/434* (2013.01); *E05Y 2201/652* (2013.01); *E05Y 2400/612* (2013.01); *E05Y 2900/132* (2013.01)

(56) References Cited

U.S. PATENT DOCUMENTS

| | | | | | |
|---|---|---|---|---|---|
| 3,739,832 | A * | 6/1973 | Sivin | E06B 9/70 | 160/310 |
| 3,866,656 | A * | 2/1975 | McCabe | G08B 17/06 | 160/1 |
| 4,519,487 | A * | 5/1985 | Florin | E06B 9/74 | 192/36 |
| 4,651,940 | A * | 3/1987 | Nakamura | E06B 9/88 | 160/310 |
| 5,247,763 | A * | 9/1993 | Hein | E05F 15/643 | 49/404 |
| 5,711,360 | A * | 1/1998 | Viotte | E06B 9/74 | 160/310 |
| 6,055,885 | A * | 5/2000 | Shea | E06B 9/74 | 49/140 |
| 6,253,824 | B1 * | 7/2001 | Mullet | E05F 15/603 | 192/69.7 |
| 6,283,189 | B1 * | 9/2001 | Liebscher | E05F 15/605 | 160/188 |
| 6,381,903 | B1 * | 5/2002 | Desrochers | E06B 9/74 | 160/310 |
| 7,240,582 | B1 * | 7/2007 | Manaras | E05F 15/692 | 74/567 |
| 7,261,139 | B2 * | 8/2007 | Varley | E06B 9/76 | 160/310 |
| 7,537,038 | B2 * | 5/2009 | Hsieh | E06B 9/74 | 49/141 |
| 9,017,196 | B2 * | 4/2015 | Gunton | E05F 15/668 | 74/606 R |
| 9,341,022 | B2 * | 5/2016 | Nicholson | E05F 15/684 | |
| 9,689,203 | B1 * | 6/2017 | Freberg | E06B 9/68 | |
| 10,202,803 | B2 * | 2/2019 | Hsieh | F16D 65/22 | |
| 10,655,384 | B2 * | 5/2020 | Foley | E06B 9/60 | |
| 11,643,849 | B2 * | 5/2023 | Magro | E06B 9/74 | 160/310 |
| 12,123,244 | B2 * | 10/2024 | Nowak | E05F 1/006 | |
| 2023/0043445 | A1 * | 2/2023 | Le | E06B 9/74 | |

FOREIGN PATENT DOCUMENTS

| | | | | | |
|---|---|---|---|---|---|
| CN | 201661222 | U | | 12/2010 | |
| DE | 3426428 | C1 | | 8/1985 | |
| DE | 10034292 | A1 | * | 1/2002 | E05F 1/16 |
| DE | 102016225078 | A1 | * | 6/2018 | E05F 15/72 |
| EP | 0703340 | A1 | * | 3/1996 | E05F 15/686 |
| EP | 3252259 | A1 | | 12/2017 | |
| EP | 3339561 | B1 | | 8/2020 | |
| FR | 2742474 | A3 | * | 6/1997 | E05F 15/72 |
| FR | 2873150 | A1 | * | 1/2006 | E05F 15/643 |
| FR | 2968698 | A1 | * | 6/2012 | E05F 15/72 |

* cited by examiner

EMERGENCY OPENING DEVICE FOR A LIFTING GATE ASSEMBLY, LIFTING GATE ASSEMBLY AND METHOD FOR OPENING A LIFTING GATE ASSEMBLY WITH AN EMERGENCY OPENING DEVICE

CROSS-REFERENCE TO RELATED APPLICATIONS

This application is a National Stage of International Application No. PCT/EP2022077208, filed Sep. 29, 2022, which claims the benefit and priority of German Patent Application No. 10 2021 127 311.0, filed Oct. 21, 2021. The entire disclosure(s) of (each of) the above application(s) is (are) incorporated herein by reference.

TECHNICAL AREA

The present disclosure relates to lifting gate assemblies in general and in particular to emergency opening devices for such lifting gate assemblies.

TECHNICAL BACKGROUND

Lifting gate assemblies have been used for a long time, for example in factories or warehouses, as passageways or passages between separate areas. Lifting gate assemblies of this type are equipped with a vertically movable lifting gate, which is guided in two lateral door frames. The lifting gate is pulled upwards by a drive device when the lifting gate assembly is opened and lowered downwards when the lifting gate assembly is closed. In the state of the art, lifting gate assemblies having a flexible, foil-like lifting gate and lifting gate assemblies having segmented lifting gates with individual fixed lifting gate segments pivotably connected to each other are known. One or more electric motors are generally used as the drive device for opening and closing such lifting gate assemblies. However, such electric motors can become inoperable in the event of a power failure, making it impossible to open and close the lifting gate of the lifting gate assembly by means of the drive device.

SUMMARY

Accordingly, it can be regarded as an objective of the invention to provide a purely mechanical emergency opening device for a lifting gate assembly, the operation of which does not require any electrical energy.

This objective is solved by an emergency opening device, by a lifting gate assembly having such an emergency opening device and by a method for operating such an emergency opening device in accordance with the independent patent claims. Further embodiments will become apparent from the dependent claims and from the following description.

According to a first aspect, an emergency opening device for a lifting gate assembly is provided. The emergency opening device has a driver, a movement element, an elongate drive member and a locking element. The driver is rotatably mountable on a rotationally fixed inner shaft of a drive device of the lifting gate assembly and is configured to be selectively connected to the drive device. The elongate drive member is connected to the movement element and is configured to transmit a movement caused by the movement element to the driver.

The emergency opening device can be fitted to an electrically powered drive device of a lifting gate assembly to enable the lifting gate of the lifting gate assembly to be opened even if the drive device becomes inoperable. Such a situation can occur, for example, due to a power failure or a technical defect in the drive device. The drive device for which the emergency opening device is used can, in particular, be a drive device with a fixed inner shaft and a rotating hollow shaft, which is driven, for example, by an external rotor motor or in another suitable manner. Such a hollow shaft can, for example, wind a foil-like lifting gate directly or drive a toothed pulley or any other suitable drive member to lift a fixed lifting gate, for example a segmented lifting gate of a sectional door or a spiral door, via a belt, a chain or any other suitable means.

The driver can be, for example, a toothed pulley, a V-belt pulley, a sprocket, or any other passive drive element that can be set in rotary motion.

For a lifting gate assembly having a fixed inner shaft and rotating outer shaft, the driver can be rotatably mounted on the inner shaft, for example by means of ball bearings or other suitable pivot bearings. Furthermore, the driver can be selectively connected to the drive device, i.e. the driver can be set to a state connected to the drive device and to a state disconnected from the drive device. The driver can be connected to the drive device, for example, by means of bolts which are in a disengaged state by default and can be pushed in as required so that the bolts connect the driver to the drive device. For example, the bolts can be engaged in recesses in a lateral bearing of the outer hollow shaft, as will be explained in the detailed description with reference to an exemplary embodiment. Such bolts can, for example, be held in their released initial position by pre-tensioned springs, which can be released and thus displace the bolts in the direction of the drive device. However, it should be noted that any other releasable connection of the driver to the drive device is also possible and conceivable.

Although described above in relation to a drive device with a fixed inner shaft and a rotatable outer hollow shaft, the emergency opening device can also be used for lifting gate assemblies with a fixed motor or a fixed hollow shaft and a rotatable inner shaft, such as a drive device with an internal rotor motor driving an inner shaft. It is only necessary that the driver can be selectively connected to the drive device. In the case of a rotatable inner shaft, the driver is also rotatably mounted on the inner shaft, but will not be connected to a bearing of the hollow shaft when necessary, but rather to the inner shaft, so that a rotary movement of the driver can be transmitted to the inner shaft. For example, bolts can be inserted radially from the outside within the driver (for example inside a toothed pulley in the plane of the toothed pulley and radially displaceable) into corresponding recesses in the inner shaft.

In other words, the driver of the emergency opening device is designed in such a way that it can be driven independently of the drive device, for example via a toothed belt, and can be connected to the respective movable element of the drive device when required in order to transmit a rotary movement applied to the driver to the drive device.

The elongate drive member can be, for example, a toothed belt, a V-belt, a chain or any other elongate drive member that can be used to generate a rotary movement of the driver. Such a drive member can, for example, be placed around the driver. The elongate drive member can be placed around the driver once or several times and. The configuration in which the driver is a toothed pulley and the elongate drive member is a toothed belt that is wrapped around the driver several times, i.e. wound onto the driver, is merely an example. In this configuration, the toothed belt, when driven and unwound from the driver, imparts a rotational movement to the driver, which in turn is transmitted through the driver to the drive device when the driver is connected to or engaged with the drive device, for example by inserting the bolts of the driver described above.

As described below with reference to various embodiments, the movement element can, for example, be an elastic element or a battery-powered electric motor. However, any other movement element that drives the elongate drive member is also conceivable. In particular, an elastic element and a motor can also be combined.

The locking element can be any type of element that prevents movement of the driver relative to the inner shaft. For example, the locking element may be a pawl, as described below with reference to one embodiment. However, it should be noted that such a pawl is merely a non-limiting exemplary locking element and any other suitable locking element capable of selectively blocking or enabling rotation of the driver relative to the inner shaft may also be used. The locking element, as well as the connection of the driver to the drive device, can be carried out purely mechanically by a user using muscle power.

To open the lifting gate assembly using the emergency opening device, the driver can therefore first be connected to the drive device as described above, for example by inserting corresponding bolts. The locking element can then be released, allowing the driver to rotate. This enables the movement element to drive the elongate drive element. For example, in corresponding embodiments, an elastic element is enabled to relax and transfer the stored tension energy via the elongate drive element and the driver in the form of a rotary movement to the drive device, thereby opening the lifting gate assembly. In embodiments with a battery-operated electric motor as the movement element, the electric motor is activated. This allows the motor shaft to wind up the elongate drive element, causing the elongate drive element to unwind from the driver and thereby drive the driver.

According to an embodiment, the movement element is an elastic element. The elastic element is pretensioned in a standby position and is configured to relax and drive the elongate drive member by the released tension energy when the locking element is released.

The elastic element can be, for example, a spring, a rubber band or any other suitable elastic element capable of storing tension energy. For example, the elastic element can be a spiral spring, which in the standby position (i.e. in the position in which the emergency opening device currently is not used but is kept ready in case of a power failure or similar) is tensioned. The elastic element is connected to the elongate drive member in such a way that a movement of the elastic element, for example when the exemplary spring is released, is transmitted to the elongate drive member. The elastic element can be held in the pretensioned position, for example, by corresponding mechanical latching elements. The elastic element (e.g. a spiral spring) can, for example, be attached at one end to a lower end of a door frame. The other end of the elastic element is connected to the elongate drive member. The elongate drive member can, for example, be wound onto the driver in the standby state of the emergency opening device and run over a deflection pulley below the drive device of the lifting gate assembly. Below the deflection pulley, the free end of the elongate drive member can then be connected to the elastic element, for example the spring, so that when the spring retracts from the pretensioned position to its rest position when the emergency opening device is triggered, it pulls the elongate drive member over the deflection pulley and unwinds it from the driver, thereby driving the driver.

According to a further embodiment, the elastic element is a spring.

The spring can be any suitable type of spring. For example, the spring can be a spiral spring configured as a compression spring or as a tension spring. The use of a torsion spring is also conceivable. In any case, the spring is suitable for storing tension energy and releasing this tension energy when the spring is allowed to relax. In the standby state of the emergency opening device, the spring is pretensioned and is released when the emergency opening device is actuated in order to drive the elongate drive element and thereby drive the driver.

According to a further embodiment, the movement element is an electric motor with a motor shaft. The electric motor is connected to a battery and can be supplied with electrical energy by the battery. The electric motor is activated, and the motor shaft winds up the elongate drive member when the locking element is released. In the process, the elongate drive member is unwound from the driver, thereby setting the driver in rotary motion. A current flow through the motor can be made possible by a purely mechanically actuated switch, so that the emergency opening can also be operated when no external energy (i.e. energy that is not stored in the battery) is available.

According to a further embodiment, the driver has at least one releasable connecting element.

The detachable connecting element can be any suitable component that enables the driver to be selectively connected to the drive device. However, the connecting element in any case is designed so that it can be actuated purely mechanically and does not require any electrical energy. In the standby state of the emergency opening device, the releasable connecting element is in the released position.

According to a further embodiment, the releasable connecting element is a bolt which is displaceable through an opening in the driver in such a way that the bolt, in an engaged position, engages with a recess in the drive device.

The function of such a bolt has already been explained above. The bolt extends perpendicular to a plane formed by the driver and through corresponding openings in the driver. Each bolt is longitudinally displaceable along the corresponding opening in the driver. In a disengaged state, the bolt does not protrude laterally beyond the driver. In an engaged state, however, the bolt protrudes laterally from the corresponding opening. However, part of the bolt is still inside the driver. In the installed state of the emergency opening device, the protruding section of the bolt engages in a recess of the drive device corresponding to the bolt. Such a recess can, for example, be a hole in the drive device. For example, such a recess can be located in a lateral bearing washer of an outer hollow shaft of a lifting gate assembly if the drive device is a drive device with a fixed inner shaft and a driven hollow shaft.

In the case of a drive device with a rotatable inner shaft and a stationary hollow shaft or a stationary outer part of the drive, the bolts can run radially within the driver and engage in corresponding recesses in the inner shaft. In any case, the driver is connected to the corresponding moving part of the drive device so that a rotary movement can be transmitted to this driven part by the driver.

According to a further embodiment, the elongate drive member is a belt that runs around the driver.

Such a belt can, for example, be a toothed belt, a V-belt or any other type of belt that is suitable for driving the driver. The belt is adapted to the driver. For example, the belt is a toothed belt if the driver is a toothed pulley. If the driver is a V-belt pulley, the belt is a V-belt, etc. The belt can also be wrapped around the driver once or several times.

However, a chain can also be used instead of a belt. In this case, the driver is a sprocket or contains a sprocket.

According to a further embodiment, the locking element is a pawl which, in an engaged position, blocks rotation of the driver about the rotationally fixed inner shaft and which, in a disengaged position, releases rotation of the driver about the rotationally fixed inner shaft.

The pawl can, for example, be pivotably attached to an inner part of the driver, which is firmly connected to the inner shaft at all times (when the emergency opening device is installed). An outer part of the driver can then be rotatably mounted on the inner part of the driver and have a recess into which the pawl can be pivoted in order to prevent the outer part of the driver (and thus the driver as a whole) from rotating. If the pawl is not pivoted into such a recess, the driver, or the outer part of the driver, is thus rotatable relative to the inner shaft.

Releasing the pawl from the engaged position to the disengaged position allows the driver to rotate relative to the stationary part of the drive device, thereby allowing the movement element to drive the elongate drive element. For example, in corresponding embodiments, the biased elastic element may be allowed to relax. In embodiments with an electric motor, the electric motor can be enabled to wind up the elongate drive member when the electric motor is activated. The elongate drive element in turn then drives the driver, which in turn drives the drive device to open the lifting gate of the lifting gate assembly.

According to a further embodiment, the emergency opening device also has an emergency lever for mechanical actuation of the emergency opening device.

The emergency lever is mechanically connected to the locking element and the driver or to the releasable connecting elements of the driver (in corresponding embodiments) and can be mechanically actuated to release and lock the locking pawl as well as to connect the driver to the drive device. For example, corresponding cable pulls can be provided for this purpose. Furthermore, the emergency lever can also be connected to a brake of the drive device in order to actuate or release it in the event of a power failure.

The emergency lever can be attached to a lifting gate assembly in a position that is easily accessible to a user. Preferably, the emergency lever is attached to the side of the lifting gate assembly on the gate frames. However, other suitable positions are also conceivable.

According to a further embodiment, the emergency lever has at least four successive latching positions. In the first of the four latching positions, the emergency opening device is in a rest position in which the locking element is locked and in which the driver is released from the drive device. In the second of the four latching positions, the driver is connected to the drive device. In the third of the four locking positions, the locking element further is released. In the fourth of the four locking positions, a brake of the drive device is further released.

Since the locking element is locked in the standby state in the first position and the driver is released or disengaged from the drive device, the drive device can be operated normally with electrical energy. The emergency opening device is only kept ready in this position by keeping the movement element ready. For example, the elastic element is kept pre-tensioned, or the electric motor is kept ready for activation. As the driver is locked by the locking element, the driver cannot rotate. This also prevents the elastic element from being relaxed or the electric motor (generally the movement element) from being activated because the movement element is connected to the driver via the elongate drive element and therefore the movement element, the elongate drive element, and the driver can only move together. In embodiments with an electric motor as the movement element, the electric motor also remains deactivated in the first position. Furthermore, the driver cannot be moved by the drive device in this state.

When the emergency lever is actuated to cause an emergency opening, the driver is first mechanically connected to the drive device in the second position, for example by moving the bolts described above via corresponding cable pulls.

In the third position, in addition to the connection of the driver to the drive device, the locking element is released, for example also via corresponding cable pulls, in order to enable a rotary movement of the driver. In embodiments with an electric motor as the movement element, the electric motor is simultaneously supplied with energy from the battery, for example by moving a corresponding mechanical switch, and thereby activated. In embodiments of the lifting gate assembly in which there is no additional brake in the drive device, the emergency opening device is already activated in this position and the lifting gate is lifted by the emergency opening device.

In the fourth position, any brake on the drive device is also released mechanically, for example also by corresponding cable pulls. In the case of drive devices with brakes, the emergency opening is triggered in this position because this is the only way to enable the drive device to be moved by the emergency opening device.

All work steps for triggering the emergency opening can be carried out using the emergency lever with a single operating unit. As the sequence of the corresponding work steps is also specified by the emergency lever, incorrect operation by a user is prevented.

According to a further aspect, a lifting gate assembly is provided. The lifting gate assembly has a drive device with a rotatably fixed inner shaft and a brake, a lifting gate, two door frames and an emergency opening device as described above. The lifting gate is guided in the door frames. The drive device is designed to raise and lower the lifting gate using electrical energy. The driver of the emergency opening device is rotatably mounted on the rotatably fixed inner shaft. The drive device is configured to be connected to the driver. The emergency opening device can be actuated purely mechanically to open the lifting gate of the lifting gate assembly in the event of a power failure.

The drive device can be any suitable drive device for lifting gate assemblies. In particular, it is a drive device with a fixed inner shaft and a concentrically arranged rotating hollow shaft, which is used to raise and lower the lifting gate. The lifting gate can be guided in the door frames, for example in corresponding guides. The lifting gate can be either a fixed segmented lifting gate or a foil-like lifting gate that is wound directly onto the hollow shaft. In the case of lifting gate assemblies with fixed segmented lifting gates, the lifting gate can be accommodated in a spiral shape within a door lintel when opened by the drive device, or it can be pushed vertically upwards or under a ceiling of a room, as is known from standard sectional doors. In particular, the drive device can be arranged above the door opening in the door lintel.

The emergency opening device can be designed according to any of the previously described embodiments. As described above, the driver of the emergency opening device is arranged adjacent to the drive device, i.e. also within the door lintel, and can be selectively connected to the drive device. The elongate connecting element of the emergency opening device can extend together with the movement element within at least one door frame. The driver is then arranged above the corresponding door frame in the door lintel adjacent to the drive device and can be selectively connected to it. During normal operation of the lifting gate assembly, the movement element is held in the standby position, as described above, and the driver is uncoupled from the drive device. In this state, the lifting gate assembly is only driven electrically via the drive device. In an emergency, for example in the event of a power failure or technical defect in the drive device, the emergency opening device can be used as described above to open the lifting gate of the lifting gate assembly without using the drive device directly, i.e. without the need for external electrical power.

Instead of just one emergency opening device in one door frame, two emergency opening devices can also be used in both door frames. In such designs, there is a driver on each side of the drive device and a movement element and an elongated connecting element in each door frame.

According to a further aspect, a method for operating a lifting gate assembly described above is provided. The method comprises as a first step connecting the driver to the drive device in a rotationally fixed manner. The method then proceeds with releasing of the locking element, thereby enabling a rotational movement of the driver relative to the rotationally fixed inner shaft. Finally, the method comprises releasing the brake of the drive device and thereby opening the lifting gate of the lifting gate assembly by means of the tension energy stored in the elastic element.

In summary, the invention thus provides an emergency opening device for a lifting gate assembly that can be actuated purely mechanically. Such an emergency opening device can be used in the event of a power failure to open a locked lifting gate of a lifting gate assembly and thereby, for example, to clear an escape route. The emergency opening device can also be easily maintained and retrofitted due to its modular design and is particularly suitable for a lifting gate assembly with a fixed inner shaft. Operating the emergency opening device with just a single emergency lever, which performs all the necessary mechanical movements in sequence, is also intuitive and easy to operate in the event of an emergency or panic.

BRIEF DESCRIPTION OF THE FIGURES

In the following, the enclosed figures are used to describe embodiments in more detail. The illustrations are schematic and not to scale. Identical reference signs refer to identical or similar elements. The figures show.

DETAILED DESCRIPTION

The present disclosure relates to emergency opening devices for lifting gate assemblies. Such an emergency opening device is generally understood herein to be an opening device for a lifting gate of a lifting gate assembly, which can be used in exceptional circumstances to open the lifting gate of the lifting gate assembly. For example, such an emergency opening can take place if the drive device of the lifting gate assembly, which is normally used to open the gate, is not operational due to a power failure or a technical defect. However, it is also conceivable that the emergency opening device can be used as a panic opening, even if the drive device is still operational. For example, in situations, in which a user has problems operating the drive device to open the door normally but wants to leave the room that is separated by the lifting gate and therefore panics. In such a case, a user is therefore provided with a simple and intuitive option for opening the lifting gate of the lifting gate assembly, for example with an emergency lever 17, as described below.

Figure 1:
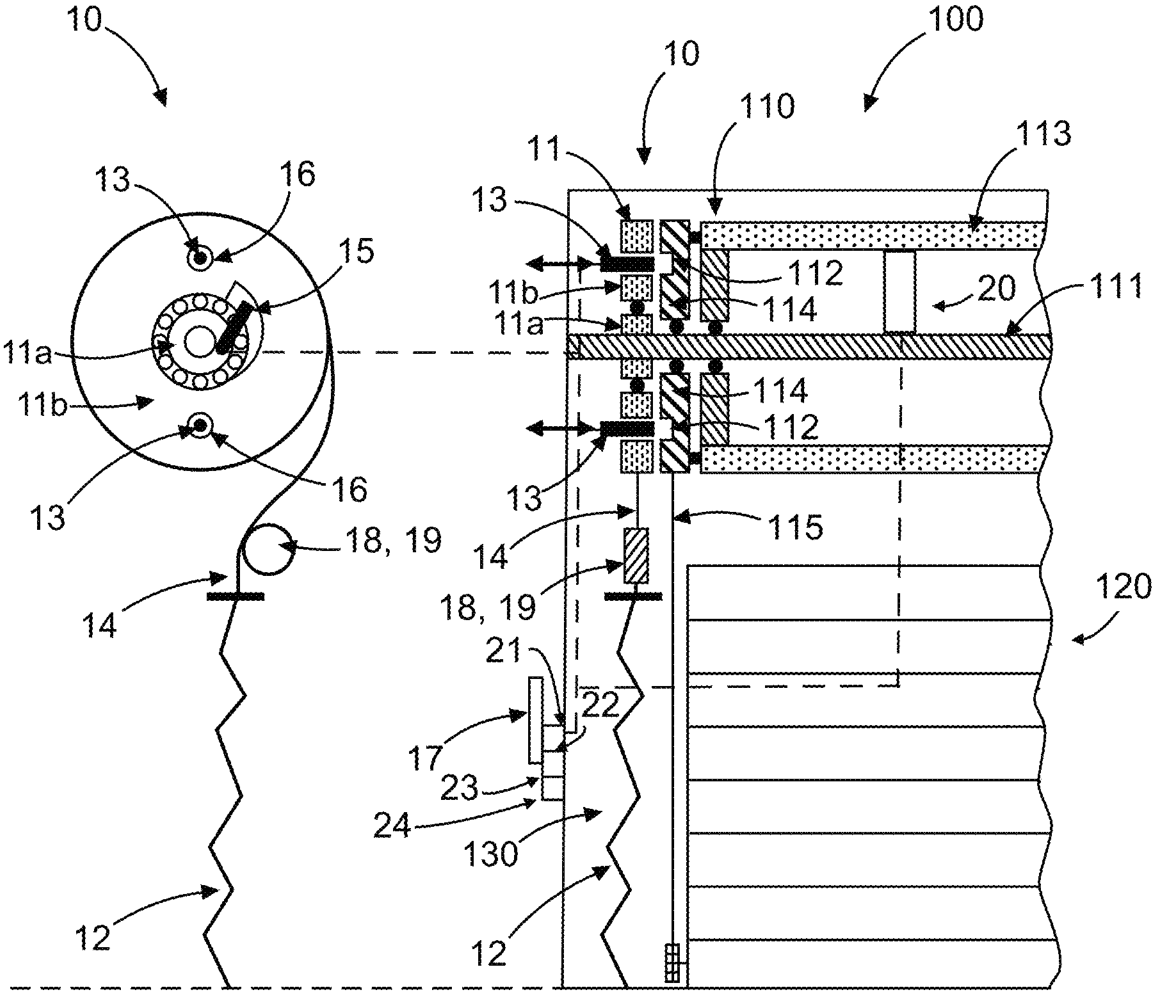
FIG. 1 is a schematic representation of an emergency opening device on a lifting gate assembly with a drive device with a fixed inner shaft in a standby state according to an exemplary embodiment.

FIG. 1 shows an emergency opening device 10 in a closed lifting gate assembly 100 in a standby state according to an exemplary embodiment. The right-hand side of FIG. 1 shows a frontal view of the left-hand side of the lifting gate assembly 100. The left-hand side of FIG. 1 shows a schematic side view of the emergency opening device 10. Components of the drive device 110 of the lifting gate assembly 100 are not shown on the left-hand side of FIG. 1.

The lifting gate assembly 100 has a drive device 110 and an emergency opening device 10.

The drive device 110 has a fixed inner shaft 111 and a hollow shaft 113 that rotates around the outside and is arranged concentrically to the inner shaft. The hollow shaft 113 is rotatably mounted on the inner shaft 111 and, together with the inner shaft 111, forms an external rotor motor. Specific drive components of this external rotor motor, such as magnetic coils in a stator or rotor, are not shown for the sake of clarity. However, inside the hollow shaft 113, a stator can be connected in a rotationally fixed manner to the inner shaft 111 and is surrounded by a rotor, which in turn is connected to the hollow shaft 113 in a rotationally fixed manner. As a result, the external rotor motor formed in this way drives the hollow shaft 113, whereas the inner shaft 111 is fixed relative to the lifting gate. A toothed pulley 114 is also rotatably mounted on the inner shaft 111 and is fixedly connected to the hollow shaft 113. A toothed belt 115 is attached to the toothed pulley 114, which runs over a deflection pulley on the underside of a door frame 130 and is attached to a lowermost segment of a segmented lifting gate 120. When the drive device 110 is put into operation, the hollow shaft is set into a rotary motion. As a result, the toothed pulley 114 is driven and the lifting gate 120 is raised or lowered.

The emergency opening device 10 has a driver 11, a movement element 12, an elongate drive element 14, a deflection pulley 18 and a locking element 15.

In the embodiment shown in FIG. 1, the driver 11 is designed as a toothed pulley. A radially inner section 11*a* of the driver 11 is fixedly connected to the inner shaft 111. A radially outer section 11*b* of the driver 11 is rotatably mounted on the radially inner section. The driver 11 also has two openings 16 designed as through-holes. A releasable connecting element 13, which is designed as a bolt in FIG. 1, is fitted in each of these openings 16. These bolts are linearly displaceable along the respective through hole in the driver 11, as indicated by the two double arrows. In addition, two recesses 112 corresponding to the bolts are provided in the toothed pulley 114 of the drive device 110, which in FIG. 1 are designed as holes into which the bolts can be inserted. Thus, the driver 11 is connected in a rotationally fixed manner to the drive device 110 or to the toothed pulley 114 of the drive device 110 when the bolts are inserted into the recesses 112.

In FIG. 1, the movement element 12 is designed as an elastic element 12 (as a spiral spring). The elongate drive element 14 is designed as a toothed belt, runs over the driver 11 and over the deflection pulley 18, and is connected to the spiral spring at one end (at the end facing away from the driver 11 in vertical alignment from the deflection pulley 18). The toothed belt is connected to the driver 11 at the other end and is wound several times around the driver 11. The locking element 15 is designed as a pawl in FIG. 1. This pawl is pivotably connected at one end to the inner section of the driver 11. The pawl can be pivoted radially outwards into a corresponding notch in the outer section of the driver 11. The locking pawl is shown in FIG. 1 in this locked state and therefore prevents the outer section of the driver 11, and thus the entire driver 11, from rotating about the inner shaft 111. Although shown in FIG. 1 with an elastic element 12 as movement element 12, it should be noted that any other suitable movement element 12 can also be used. For example, as described above, a battery-powered electric motor 19 with a motor shaft configured to wind and unwind the elongate drive member 14 from the driver 11 may be used instead of the pulley 18. In this case, the elastic element 12 is omitted. However, a combination of elastic elements 12 and electric motors 19 is also conceivable.

FIG. 1 shows the emergency opening device 10 in a standby state. In this state, the elastic element 12 is pretensioned, i.e. the spiral spring is stretched and thus stores tension energy. Since the locking element 15 is locked and thus prevents the driver 11 from rotating, and since the elongate drive member 14 (toothed belt) runs over the driver 11 and is connected to the elastic element 12 (spring), the spring cannot relax and is held in the tensioned state. Since the releasable connecting elements 13 (bolts) in FIG. 1 are also in the disengaged position, the driver 11 is uncoupled from the drive device 110. The drive device 110 can therefore be operated freely with electrical energy without being influenced or hindered by the emergency opening device 10.

Figure 2:
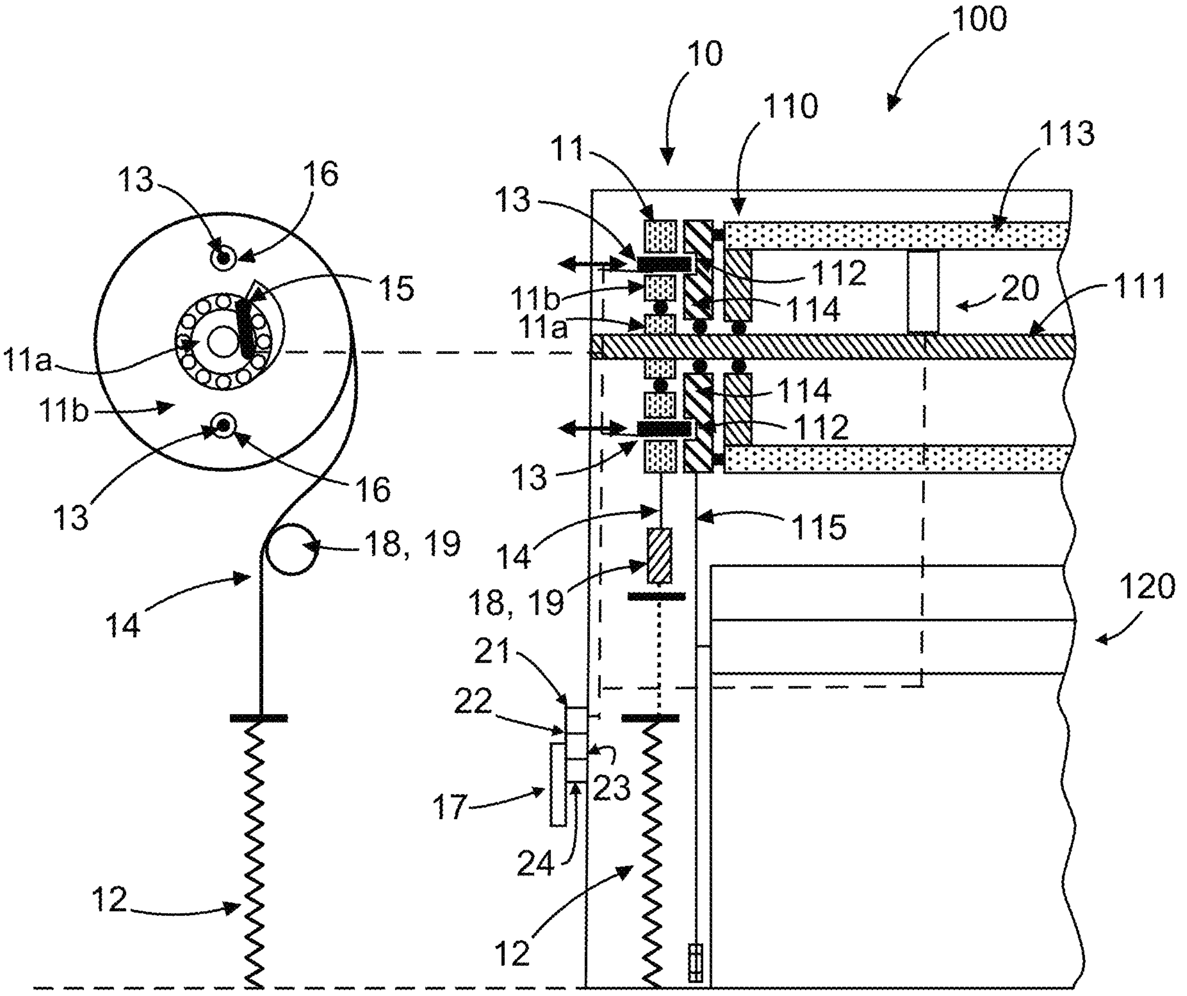
FIG. 2 is a schematic representation of the emergency opening device from FIG. 1 in an open position according to an exemplary embodiment.

FIG. 2 shows the emergency opening device 10 and the lifting gate assembly 100 from FIG. 1 in a position after the emergency opening device 10 has been triggered. This may be a situation following a power failure or a technical effect of the drive device 110, for example, as a result of which the lifting gate assembly 100 can no longer be opened electrically by the drive device 110.

In this position, the releasable connecting elements 13 (bolts) are pushed in and the driver 11 is thus coupled to the drive device 110. In addition, in FIG. 2, the locking element 15 (pawl) is pivoted into a position which allows the outer section of the driver 11 to rotate about the inner section of the driver 11, i.e. in which the driver 11 is not locked and can therefore rotate about the inner shaft 111.

Thereby, the releasable connecting elements 13 were driven into the recesses 112 in the toothed pulley 114 before the pawl was released in order to couple the driver with the drive device 110 so that a rotary movement of the driver 11 can be transmitted to the drive device 110. After the releasable connecting elements 13 were driven in, the locking element 15 was moved into the released position. This allows the elastic element 12 (spring) to relax and release the previously stored tensioning energy. In doing so, the spring drives the toothed belt 14 and thus rotates the driver 11 around the inner shaft 111. Since the driver 11 was previously coupled to the drive device 110, this rotational movement is transferred to the inoperative drive device 110, which raises the lifting gate 120 and opens the lifting gate assembly 100. When a battery-operated electric motor 19 is used instead of the deflection pulley 18 and the elastic element 12, the electric motor 19 is electrically connected to the battery via a mechanical switch at the same time the locking element 15 is released and the electric motor 19 is thus activated. As a result, the electric motor 19 winds the elongate drive member 14 onto its motor shaft and simultaneously off the driver 11, whereby the driver 11 is driven.

Although a lifting gate assembly 100 with a fixed segmented lifting gate 120 has been described with reference to FIGS. 1 and 2, it should be recognized that the emergency opening device 10 can also be used in a lifting gate assembly 100 that is equipped with a foil-like curtain as the gate leaf 120. In such a lifting gate assembly 100, the toothed pulley 114 can be omitted. The driver 11 is then located directly next to the lateral bearing (the lateral walls) of the hollow shaft 111 and can be connected directly to it, for example by providing the recesses 112 within these lateral bearings. It should also be noted that, although only one emergency opening device 10 is shown and described in FIGS. 1 and 2, a second emergency opening device 10 may also be used in a lifting gate assembly 100 on the opposite side of the drive device 110, for example to increase the speed of the opening. Such a second emergency opening device can be actuated both separately and together with the first emergency opening device.

The emergency opening device 10 can be actuated, for example, with an emergency lever 17, as described above. This emergency lever 17 can, for example, be connected to the releasable connecting elements 13 and the locking element 15 via cable pulls. Furthermore, it can also be provided that the emergency lever 17 mechanically releases a brake 20 (highly schematically shown in FIGS. 1 and 2) integrated in the drive device 110 before the lifting gate 120 of the lifting gate assembly 100 finally opens. In addition, the emergency lever 17 can have various successive actuating positions, with the sequence of the actuating positions corresponding to the intended sequence of steps for opening the lifting gate assembly 100 with the emergency opening device 10. In particular, the releasable connecting elements 13 can therefore be extended in a first actuation position 21 (and thus the driver 11 can be uncoupled from the drive device 110) and the locking element 15 can be locked. In the subsequent second actuating position 22, the releasable connecting elements 13 can first be driven in and thus the driver 11 can be coupled to the drive device 110. In the third position 23, the locking element 15 can then be released/disengaged and in a fourth position 24, the brake 20 of the drive device 110 can be released and thus the lifting gate 120 of the lifting gate assembly 100 can be opened. In the case of lifting gate assemblies 100 whose drive device 110 does not have a brake 20, opening already takes place after the third actuation position 23 of the emergency lever 17.

In all of the above cases, the lifting gate 120 of the lifting gate assembly 100 can be opened purely mechanically by a user via the emergency lever 17 in the event of a power failure or defect, without the need for electrical power.

Figure 3:
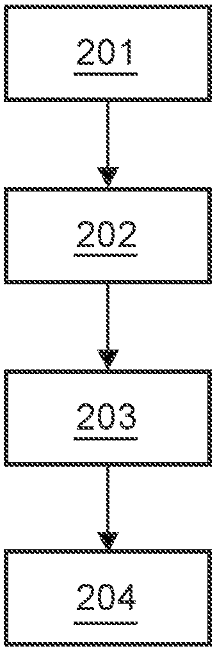
FIG. 3 is a flow chart of a method for operating the emergency opening device of the lifting gate assembly of FIG. 2 according to an exemplary embodiment.

FIG. 3 is a flow diagram of a method 200 for opening a lifting gate 120 of a lifting gate assembly 100 with an emergency opening device 10 previously described in FIGS. 1 and 2. The method 200 begins at step 201 with connecting the driver 11 to the drive device 110 in a rotationally fixed manner. For this purpose, for example, the detachable connecting elements 13 (bolts) are pushed into the recesses 112.

At step 202, the locking element 15 is then moved to the released position to allow rotation of the driver via the tensioning energy of the elastic element 12 (or via the drive power of the electric motor 19 in corresponding embodiments). In embodiments of the lifting gate assembly 100 in which the drive device 110 does not comprise an internal brake 20, the procedure ends here and the lifting gate 120 of the lifting gate assembly 100 opens.

In embodiments of the lifting gate assembly 100 in which the drive device 110 comprises an internal brake 20, this brake 20 is released mechanically in step 203, for example, as described above, via corresponding cable pulls, which are actuated with the corresponding actuation position of the emergency lever 17.

After the emergency opening device 10 has been triggered, the emergency opening device 10 can be put back into the standby state by the drive device 110 as soon as the drive device 110 is operational again. To do this, the drive device 110 simply has to be operated in the opposite direction until the elastic element is pretensioned again. The locking element 15 is then locked again and the driver 11 is uncoupled again from the drive device 110 by pulling the detachable connecting elements 13 out of the recesses 112.

The above description of embodiments based on the drawings only describes exemplary embodiments. All of the features disclosed herein can also be implemented in the described and illustrated lifting gates 100 and emergency opening devices 10.

The invention claimed is:

1. An emergency opening device for a lifting gate assembly, the emergency opening device comprising:
- a driver;
- a movement element;
- an elongate drive member; and
- a locking element;
- wherein the driver is rotatably mountable on a rotationally fixed inner shaft of a drive device of the lifting gate assembly;
- wherein the driver is configured to be selectively connected to the drive device;
- wherein the elongate drive member is connected to the movement element and is configured to transmit a movement caused by the movement element to the driver;
- wherein the driver has at least one releasable connecting element;
- wherein the releasable connecting element is a bolt which is displaceable through an opening of the driver in such a way that the bolt, in an engaged position, engages with a recess of the drive device.

2. The emergency opening device according to claim 1, wherein the movement element is an elastic element;
- wherein the elastic element is biased in a standby position; and
- wherein the elastic element is configured to relax and drive the elongate drive member by the tension energy thus released when the locking element is released.

3. The emergency opening device according to claim 2, wherein the elastic element is a spring.

4. The emergency opening device according to claim 1, wherein the movement element is an electric motor having a motor shaft;
- wherein the electric motor is connected to a battery and can be supplied with electrical energy by the battery; and
- whereby the electric motor is activated and the motor shaft winds up the elongate drive member if the locking element is released.

5. The emergency opening device according to claim 1, wherein the elongate drive member is a belt extending around the driver.

6. The emergency opening device according to claim 1, wherein the locking element is a pawl which, in an engaged position, blocks rotation of the driver about the rotationally fixed inner shaft and which, in a disengaged position, releases rotation of the driver about the rotationally fixed inner shaft.

7. The emergency opening device according to claim 1, further comprising an emergency lever for mechanically actuating the emergency opening device.

8. The emergency opening device according to claim 7, wherein the emergency lever is movable between at least four successive latching positions.

9. A lifting gate assembly, comprising:
- a drive device with a rotationally fixed inner shaft and a brake;
- a lifting gate;
- two door frames; and
- an emergency opening device;
- wherein the emergency opening device comprises:
  - a driver;
  - a movement element;
  - an elongate drive member; and
  - a locking element;
  - wherein the driver is rotatably mounted on the rotationally fixed inner shaft of the drive device;
  - wherein the elongate drive member is connected to the movement element and is configured to transmit a movement caused by the movement element to the driver;
  - wherein the driver has at least one releasable connecting element; and
  - wherein the releasable connecting element is a bolt which is displaceable through an opening of the driver in such a way that the bolt, in an engaged position, engages with a recess of the drive device;
- wherein the lifting gate is guided in the door frames;
- wherein the drive device is configured to raise and lower the lifting gate using electrical energy;
- wherein the drive device is configured to be connected to the driver; and
- wherein the emergency opening device is configured to be actuated purely mechanically in order to open the lifting gate in the event of a power failure.

10. A method of operating an emergency opening device of a lifting gate assembly,
- wherein the lifting gate assembly comprises:
  - a drive device with a rotationally fixed inner shaft and a brake;
  - a lifting gate;
  - two door frames; and
  - the emergency opening device;
  - wherein the emergency opening device comprises:
    - a driver;
    - a movement element;
    - an elongate drive member; and
    - a locking element;
  - wherein the driver is rotatably mounted on the rotationally fixed inner shaft of the drive device;
    - wherein the elongate drive member is connected to the movement element and is configured to transmit a movement caused by the movement element to the driver;
- wherein the lifting gate is guided in the door frames;

wherein the drive device is configured to raise and lower the lifting gate using electrical energy;

wherein the drive device is configured to be connected to the driver; and wherein the emergency opening device is configured to be actuated purely mechanically in order to open the lifting gate in the event of a power failure:

wherein the method comprises the steps of:

connecting the driver to the drive device in a rotationally fixed manner;

releasing the locking element, thereby enabling a rotational movement of the driver relative to the rotationally fixed inner shaft;

releasing the brake of the drive device and thereby opening of the lifting gate by the tension energy stored in the elastic element.

* * * * *